3,316,065
METHOD FOR REPROCESSING FUEL ELEMENTS WITH FISSIONABLE MATERIAL IN CARBIDE FORM WHICH ARE SPENT IN NUCLEAR REACTORS
Peter Baertschi, Birsfelden, Basel-Land, Hans-Rudolf von Gunten, Nussbaumen, Aargau, and Harry-Ernst Züst, Zurich, Switzerland, assignors to Gesellschaft zur Forderung der Forschung an der Eidgenossischen Technischen Hochschule, Zurich, Switzerland
No Drawing. Filed Dec. 9, 1963, Ser. No. 329,053
Claims priority, application Switzerland, Dec. 12, 1962, 14,672/62
8 Claims. (Cl. 23—324)

The present invention relates to an improved method for reprocessing nuclear fuel elements with fissionable material in carbide form which have been spent in nuclear reactors, as well as to an improved performance of the aforesaid method.

The fuel elements having fissionable material in carbide form and which are employed in high temperature nuclear reactors, as a rule, generally consist of a graphite cladding or casing and the fissionable material enclosed therein, as for example uranium carbide, thorium carbide or plutonium carbide. It is known to the art that the fissionable material spent in the reactor can be reprocessed according to conventional chemical processes for renewed use in the nuclear reactor. For this purpose it has been proposed up to the present to first separate the fissionable material from the casing or cladding in a mechanical manner and, as the case may be, to subsequently comminute or break-up such fissionable material, whereafter the carbide-fissionable material can be either extracted by a combination of nitric acid and hydrofluoric acid, oxidized in a oxygen stream or can be chemically disintegrated by halogens interhalogens and so forth.

Since the chemical decomposition process considerably determines the costs for reprocessing nuclear fuel elements considerable attention is directed to such. However, up to the present none of the processes concerned with this problem have been developed beyond the stage of laboratory studies. The known methods proceeded from the assumption that the mechanical separation of the carbide-fissionable material from the graphite casing could be carried out in a simple manner, which in actual practice, however, is generally associated with great difficulties due to the resulting agglomeration of the fuel element resulting during reactor operation and the very high radioactivity of the fuel element.

Accordingly, it is a primary object of the present invention to substantially overcome the aforementioned disadvantages and to provide for simplification of the reprocessing operation.

Another important object of the present invention is to provide an improved method for reprocessing fuel elements wherein separation of the fissionable material from the casing, as well as comminution of such fissionable material, is not required.

Still a further important object of the present invention is to provide an improved process for reprocessing fuel elements which is relatively simple to carry out as well as being quite economical in comparison with heretofore known techniques.

In order to achieve these objects the method of the present invention is generally manifested by the feature that the entire fuel element is burned to ash in an oxygen stream, and for initiating and maintaining such burning process additional heating power is delivered from the outside, and the occurring ash is further reprocessed in a chemical manner according to known techniques. Thus, neither a separation of the carbide-fissionable material from the graphite casing nor a mechanical break-up or comminution is necessary, whereby the mode of operation is considerably simplified and rendered more economical. The inventive process can advantageously be carried out in a cell or cabinet screened against radioactive rays. The term "ash" as employed herein is intended to generally refer to the solid residue of combustion essentially composed of a concentration of fissionable material contained in the fuel element.

The inventive apparatus for carrying out the aforesaid process is primarily manifested by the features that, above a grate there is provided a combustion compartment or chamber having an exhaust gas duct, such combustion compartment serving for the introduction of at least one fuel element, and beneath such grate there is provided an ash reservoir or storage means as well as oxygen infeed conduit means, with the combustion compartment located above the grate being surrounded by a heating device or mechanism.

Other features, objects and advantages of the invention will become apparent by reference to the following detailed description.

The process is conducted in apparatus, the actuation of which must be remotely controlled for operation in a cell or cabinet screened against radioactive rays. It is possible to reprocess fissionable material in carbide form enclosed in a graphite cladding or casing which has been spent in nuclear reactors, according to the following process:

A fuel element which is to be reprocessed is introduced in upright position into a combustion compartment when the cover is removed, and is supported upon a grate. The fuel element is neither broken-up or comminuted nor is the fissionable material freed from its casing. When a high-frequency alternating current source has been switched-in then the lowermost terminal portion of the fuel element, through the action of induction heating of an induction coil, is brought to a temperature of 600° C. up to 1600° C. for example, or eventually is still further heated. Oxygen is permitted to stream-in by means of a supply or infeed conduit which then passes through the grate and enters the combustion compartment, and there effects burning to ash the aforesaid portion of the fuel element heated by means of the high-frequency induction energy. The resultant ash or oxide residue is collected in a reservoir.

In consequence of the progressive burning-off of the lower terminal portion of the fuel element, the latter continually slides downwardly upon the grate under the influence of gravity, so that with time the entire fuel element passes through the induction heating zone of the coil and thus burns. The excess oxygen and the gases of combustion escape through an exhaust duct, whereby the gas stream passes through the electrostatic filter in which possible particles of oxides of fissionable material entrained by the gas stream are collected and recovered by means of the mentioned washing installation. The gaseous and light volatile fission products passing through the filter are subsequently removed from the gas stream by washing and adsorption in known manner. The ash in the reservoir occurring due to combustion which consists of practically pure oxides of the corresponding fissionable material and of the difficult to volatilize oxides of the fission products, is removed from time to time via a drain plug by actuating an emptying gate means, and afterwards is directly further processed in chemical manner either in aqueous phase or via a dry fluorination in accordance with reworking and purification processes used for uranium and thorium compounds. For further details regarding wet processing i.e. aqueous phase, attention is invited to the article of R. F. Blanco, L. M.

Ferris and D. E. Fergusen entitled "Aqueous Processing of Thorium Fuels," ORNL–CF–61–6–14. Regarding dry processing (fused salt volatility processes) pertinent information can be found in the ORNL Chemical Technology Division, Annual Progress Report for period ending May 31, 1961, ORNL–3153.

The frquency of the alternating current employed for induction heating is, for example, from 10 to 500 kilocycles per second and is not critical since the frequency only influences the depth of penetration of the heating zone in the fuel element. Since, as a general rule, the casing of the fuel element consists of graphite, possessing a high heat conductivity, there appears after a short operating time a uniform development of temperature in the lower region of the fuel element. Without the delivery of electric high-frequency energy the combustion or burning process comes to standstill because of the unfavorable surface-to-mass relationship of a rod-shaped fuel element.

The temperature of the waste or exhaust gases remains relatively low, for example below 100° C., which is of advantage for exhaust gas cleaning, because due to water cooling of the induction heating coil a large portion of the combustion heat is removed, and pipe coils effect an additional cooling of a steel jacket and wall of the combustion compartment.

Finally, an experimental example of the combustion or burning process is further given:

In lieu of a radioactive fuel element an approximately uniformly dimensioned graphite rod possessing a diameter of 6 centimeters and a length of approximately 1 meter is introduced into the combustion compartment. The infeed of oxygen amounted to 30 liters per minute and the high-frequency alternating current source delivered power between 5 and 7 kilowatts to the coil at a frequency of 10 kilocycles per second. As a result, there appeared an average burning temperature of 1200° C., which at maximum amounted to 1400° C., whereby the burning of the graphite rod amounted to approximately 600 grams per hour. The actual burning zone measured approximately 20 centimeters in the lengthwise direction of the rod, and ran out in an approximately pointed come towards the lower end.

The above-described process for reprocessing fuel elements can also be used without difficulty when the individual particles of fissionable material are specially encased. Specific examples of fissionable material capable of being reprocessed in accordance with the teachings of the present invention are uranium carbide, thorium carbide and plutonium carbide. The invention is particularly suited for reprocessing spent fuel elements of: the DRAGON-reactor, OECD-Project, Winfrith, England (for informative literature see, The OEEC-Dragon High Temperature Reactor Project, Annual Reports 1959–60, 1960–61, 1961–62 OECD–ENEA); the Pebble-Bed-Reactor (for informative literature see, Design Study of a Pebble Bed Reactor Power Plan, by H. P. Frass et al., ORNL–CF 60–12–5 (1960); Der gasgekühlte Hochtemperaturreaktor der Arbeitsgemeinschaft, BBC-Krupp Brown-Boveri Mitt., 47, ½ (1960) 88–96, by R. Schulten and E. Jantsch; and Design and Feasibility Study of a Pebble-Reactor Steam Power Plan, Sanderson and Porter, S+P–1963 (1958); and further, the spent fuel elements of HTGR, Peach Bottom, Ohio (for informative literature reference is made to: A Review of Fuel Element Research and Development for the HTGR, Report GA2283 (1961); Application of High Temperature Gas Cooling to Nuclear Power Plants, the HTGR, Paper SMPR/32 by F. de Hoffman, IAEA-conference on small and medium power reactors, Vienna, Austria, Sept. 5 to 9, 1960).

While there is shown and described a present preferred embodiment of the invention it is to be distinctly understood that the invention is not limited thereto but may be otherwise variously embodied and practised within the scope of the following claims.

Having thus described the present invention, what is desired to be secured by United States Letters Patent, is:

1. A method of reprocessing an elongated rod-like fuel element containing fissionable material clad or encased in graphite which are spent in nuclear reactors including the steps of: introducing the entire fuel element to be reprocessed into a combustion zone, initiating burning of the fuel element and delivering external heating power to the combustion zone during such burning for maintaining the burning process to which the entire fuel element is subjected, supplying a combustion-supporting medium into said combustion zone, and burning the entire fuel element to ash containing a concentrate of fissionable material in said combustion-supporting medium.

2. A method of reprocessing an elongated rod-like fuel element containing fissionable material clad or encased in graphite which are spent in nuclear reactors as defined in claim 1 wherein the combustion-supporting medium is an oxygen stream.

3. A method of reprocessing an elongated rod-like fuel element containing fissionable material clad or encased in graphite which are spent in nuclear reactors as defined in claim 1 wherein said fuel element incorporates fissionable material selected from the group comprising uranium carbide, thorium carbide and plutonium carbide.

4. A method of reprocessing an elongated rod-like fuel element containing fissionable material clad or encased in graphite which are spent in nuclear reactors as defined in claim 1 including the step of supporting the fuel element in substantially rod-like form on a perforated grate within said combustion zone and the external heating power is delivered to the combustion zone at least at the region of the fuel element supported upon said perforated grate such that the fuel element burns from the end supported on the perforated grate upwardly, with the ash containing a concentrate of fissionable material and resulting from combustion of the fuel element passing through the perforated grate and the fuel element continuously moves downwards on the perforated grate under the influence of gravity.

5. A method of reprocessing an elongated rod-like fuel element containing fissionable material clad or encased in graphite which are spent in nuclear reactors as defined in claim 4 wherein the external heating power is generated by high-frequency energy which is also employed for initiating burning of the fuel element.

6. A method of reprocessing an elongated rod-like fuel element containing fissionable material clad or encased in graphite which are spent in nuclear reactors comprising the steps of: introducing the entire fuel element to be reprocessed into a combustion zone, initiating burning of the fuel element and delivering external heating power to the combustion zone from the outside during such burning for maintaining the burning process to which the entire fuel element is subjected, supplying a combustion-supported medium into said combustion zone, burning the entire fuel element in said combustion-supporting medium to form an ash containing a concentrate of fissionable material, and then chemically reprocessing the resulting ash.

7. A method of reprocessing an elongated rod-like fuel element containing fissionable material clad or encased in graphite which are spent in nuclear reactors as defined in claim 6 wherein said combustion-supporting medium is an oxygen stream.

8. A method of reprocessing an elongated rod-like fuel element containing fissionable material clad or encased in graphite which are spent in nuclear reactors comprising the steps of: introducing the entire fuel element to be reprocessed containing fissionable material selected from the group comprising uranium carbide, thorium carbide and plutonium carbide into a combustion zone, initiating burning of the fuel element and delivering external heating power to the combustion zone from the outside during such burning for maintaining the burning process to which the entire fuel element is subjected, supplying an oxygen stream into said combustion zone, burning the entire fuel element to an oxide residue in said oxygen stream, and then chemically reprocessing the resulting oxide residue.

References Cited by the Examiner
UNITED STATES PATENTS

| | | | |
|---|---|---|---|
| 2,086,608 | 7/1937 | Detlor | 110—22 |
| 2,185,865 | 1/1940 | Myers | 110—22 |
| 2,797,081 | 6/1957 | Sullivan et al. | |
| 2,925,321 | 2/1960 | Mariacher. | |
| 2,992,891 | 7/1961 | Sellers. | |

OTHER REFERENCES

Reactor Fuel Processing: vol. 3, number 1, January 1960, p. 12.

CARL D. QUARFORTH, *Primary Examiner.*

BENJAMIN R. PADGETT, L. DEWAYNE RUTLEDGE, *Examiners.*

S. TRAUB, *Assistant Examiner.*